United States Patent [19]

Woo

[11] Patent Number: 4,972,210

[45] Date of Patent: Nov. 20, 1990

[54] DRIVER FOR A DIODE LASER

[75] Inventor: Nea Y. Woo, Rochester, N.Y.

[73] Assignee: Eastman Kodak Company, Rochester, N.Y.

[21] Appl. No.: 373,320

[22] Filed: Jun. 28, 1989

[51] Int. Cl.$^5$ .......................... G01D 15/16; H01S 3/13
[52] U.S. Cl. ...................................... 346/108; 372/29; 372/31
[58] Field of Search ................. 346/76 L, 108, 107 R, 346/160; 372/8, 18, 29, 30, 31, 26, 96

[56] References Cited

U.S. PATENT DOCUMENTS

| | | | |
|---|---|---|---|
| 3,225,345 | 12/1965 | Absatz et al. | 340/347 |
| 4,339,822 | 7/1982 | Kolodzey | 372/29 |
| 4,491,875 | 1/1985 | Kawamura | 358/298 |
| 4,789,987 | 12/1988 | Fraser | 372/31 |
| 4,799,069 | 1/1989 | Sasaki et al. | 346/108 |

OTHER PUBLICATIONS

"Low-Frequency Intensity Fluctuation in Laser Diodes with External Optical Feedback", *Appl. Phys. Lett.*, 38(4) Feb. 15, 1981.

"Optimum Conditions for the High Frequency Noise Reduction Method in Optical Videodisc Players", *Applied Optics*, vol. 25, No. 9, 5/86.

*Primary Examiner*—Mark J. Reinhart
*Attorney, Agent, or Firm*—Donald D. Schaper

[57] ABSTRACT

A driver is disclosed for a diode laser for use in a laser printer. The driver current is controlled in accordance with a digital video signal. In order to provide an effective means of converting the video signal to the desired driver current, the digital signal is provided to a plurality of current-weighted subdrivers. In order to overcome the effects of optical feedback in an apparatus, signals to the subdrivers are composite signals formed from a high frequency carrier and the video signal.

7 Claims, 6 Drawing Sheets

DRIVER FOR A DIODE LASER

CROSS REFERENCE TO RELATED APPLICATIONS

Reference is made to copending U.S. patent application Ser. No. 293,024, entitled "Laser Printer", filed in the name of J. C. Owens et al., on Jan. 3, 1989. This application is assigned to the assignee of the present application.

BACKGROUND OF THE INVENTION

1. Field of the Invention

The present invention relates to a driver for a diode laser, and more prticularly, to a driver which is not affected by optical feedback.

2. Description of the Prior Art

Diode lasers are being used increasingly as light sources in applications such as laser printers. The use of diode lasers reduces the cost of the printer and permits a drastic reduction in the size and complexity of printer. Diode lasers can be modulated directly by simply modulating the drive current, and thus, no external modulators are required. Although these advantages provide substantial benefits, there is a problem in using diode lasers in apparatus which produce optical feedback.

Optical feedback occurs when a minute fraction of the laser output is reflected back into the diode laser by an external optical surface in the apparatus. The effects of optical feedback on diode lasers have been noted in a paper entitled "Low-frequency intensity fluctuation in laser diodes with external optical feedback," App. Phys. Lett. 38(4), Feb. 1981. Noise and instability caused by optical feedback can be especially troublesome in analog applications such as coninuous-tone scan printers. As a result of the optical feedback, there is a nonlinear relationship between drive current and diode laser output, and this nonlinearity makes calibration very difficult in a continuous-tone scan printer. One common technique used to prevent optical feedback is to employ an optical isolator which blocks the backward propagation of light into the diode laser cavity. The optical isolator could include, for example, a linear polarizer and a quarter-wave plate. An optical isolator of this type, however, produces circular polarization, and thus, it is not suitable for certain applications, for example, applications which use dichroic beam combiners. Other known types of optical isolators are bulky and expensive.

In U.S. Pat. No. 4,799,069, there is disclosed a laser printer comprising a diode laser which is modulated in accordance with levels of an analog signal. In order to prevent mode hopping noise and optical feedback induced intensity noise, the output of the diode laser is turned off or reduced in level for a certain amount of time in each time period corresponding to a pixel of the printed image. One problem with the apparatus disclosed in the patent is that complex circuitry, including a digital-to-analog converter, is needed to control the current in the laser diode. A further problem is that the image signal is pulse amplitude modulated at a frequency which is too low to overcome the effects of optical feedback.

SUMMARY OF THE INVENTION

It is an object of the present invention to overcome the problems discussed above in the prior art and to provide an improved driver for a diode laser.

In accordance with one aspect of the invention, there is provided a driver for a diode laser for use in an apparatus which produces optical feedback, the driver being adapted to receive a digital video signal and to produce an output which is proportional to the magnitude of the signal, the driver comprising: means for generating a composite signal which is comprised of the digital video signal and an RF signal; and means for receiving the composite signal and for producing a current in the diode laser which is proportional to the magnitude of the composite signal, the receiving and producing mean including a plurality of subdrivers.

In one embodiment of the present invention, there is provided a driver for a diode laser which is used in, for example, a laser printer. The driver includes a plurality of current-weighted subdrivers. The actuation of each subdriver is controlled by one bit of a digital video signal. The combined output current, determined by the number of subdrivers actuated, is used to drive the diode laer. Thus, the magnitude of the analog output of the diode laser is determined by the set of binary numbers in the video signal. Each of the subdrivers can include, for example, an emitter-coupled logic (ECL) gate.

The drive signal to each ECL gate is provided through an AND gate. One input to the AND gate is one bit of the digital video signal, and a second input is a radio frequency carrier signal. The two signals combine to give a composite signal which is used to control the ECL gate.

The driver of the present invention includes an effective means of eliminating the effects of optical feedback in a device which uses a diode laser as a light source. The use of high frequency modulation to overcome the effects of optical feedback is much less expensive than the use of optical methods to prevent optical feedback. The present invention does not change the linear polarization of the laser beam, and thus, it is particularly suitable for certain applications.

Other features and advantages will become apparent upon reference to the following description of the preferred embodiment when read in light of the attached drawings.

DESCRIPTION OF THE PREFERRED EMBODIMENT

Figure 1:
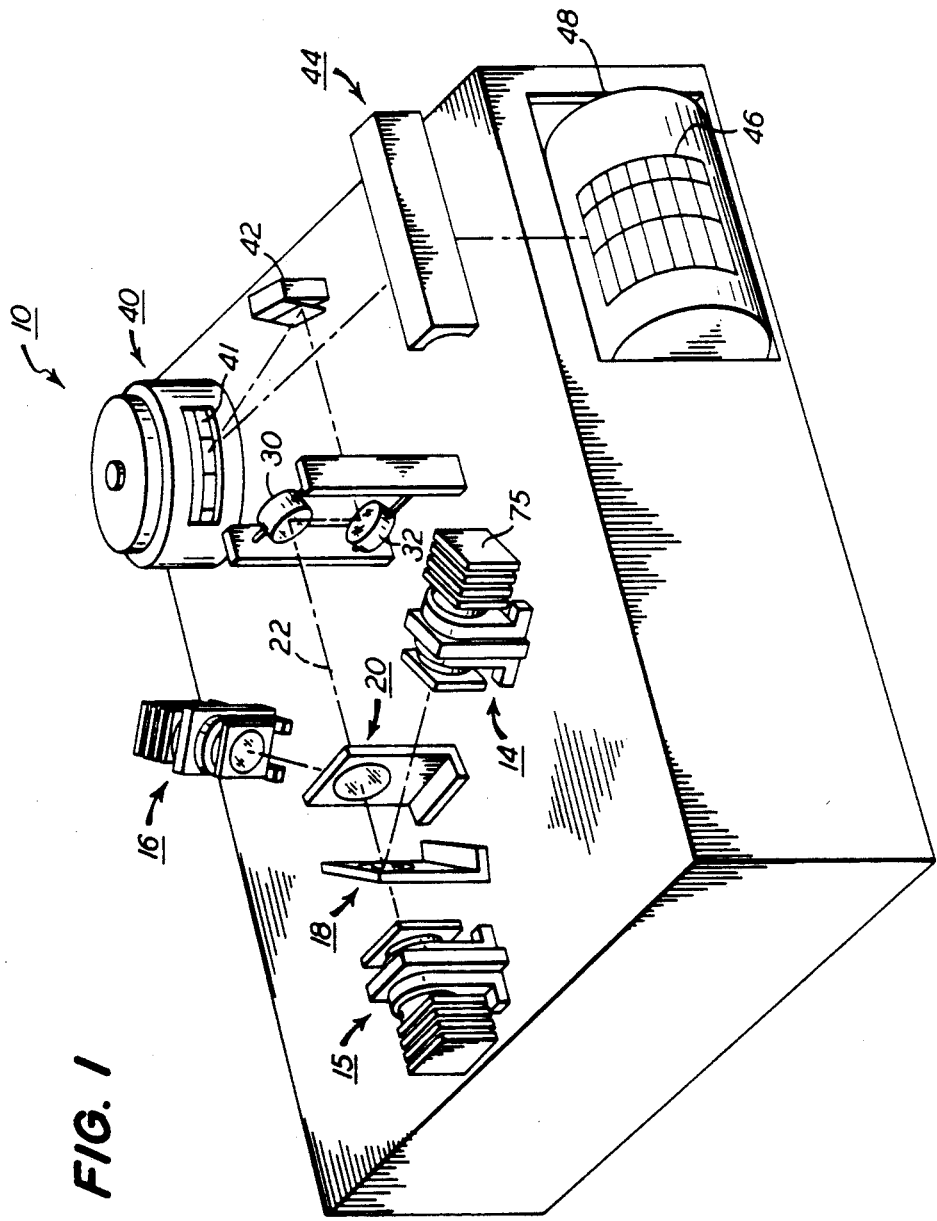
FIG. 1 is a perspective view of a laser printer which is adapted to use the driver of the present invention.

With reference to FIG. 1, there is shown a diode laser printer 10 of a type which is adapted to employ the driver of the present invention. Printer 10 comprises three optical heads which are designated 14, 15, and 16. The optical heads 14–16 are disposed in a circular arrangement and are spaced 120° apart. Beams from diode lasers (not shown) in the optical head 14–16 are combined by dichroic mirrors 18 and 20. A combined beam from mirrors 18 and 20 travels along an optical axis 22 to spherical mirrors 30 and 32.

The combined beam reflected from spherical mirror 32 is directed onto a rotatable polygon 40 by a turning mirror 42. Polygon 40 scans the beam across a cylinder mirror 44 which directs the beam onto a receiving medium 46. Receiving medium 46 is mounted on a rotatable drum 48.

Figure 2:
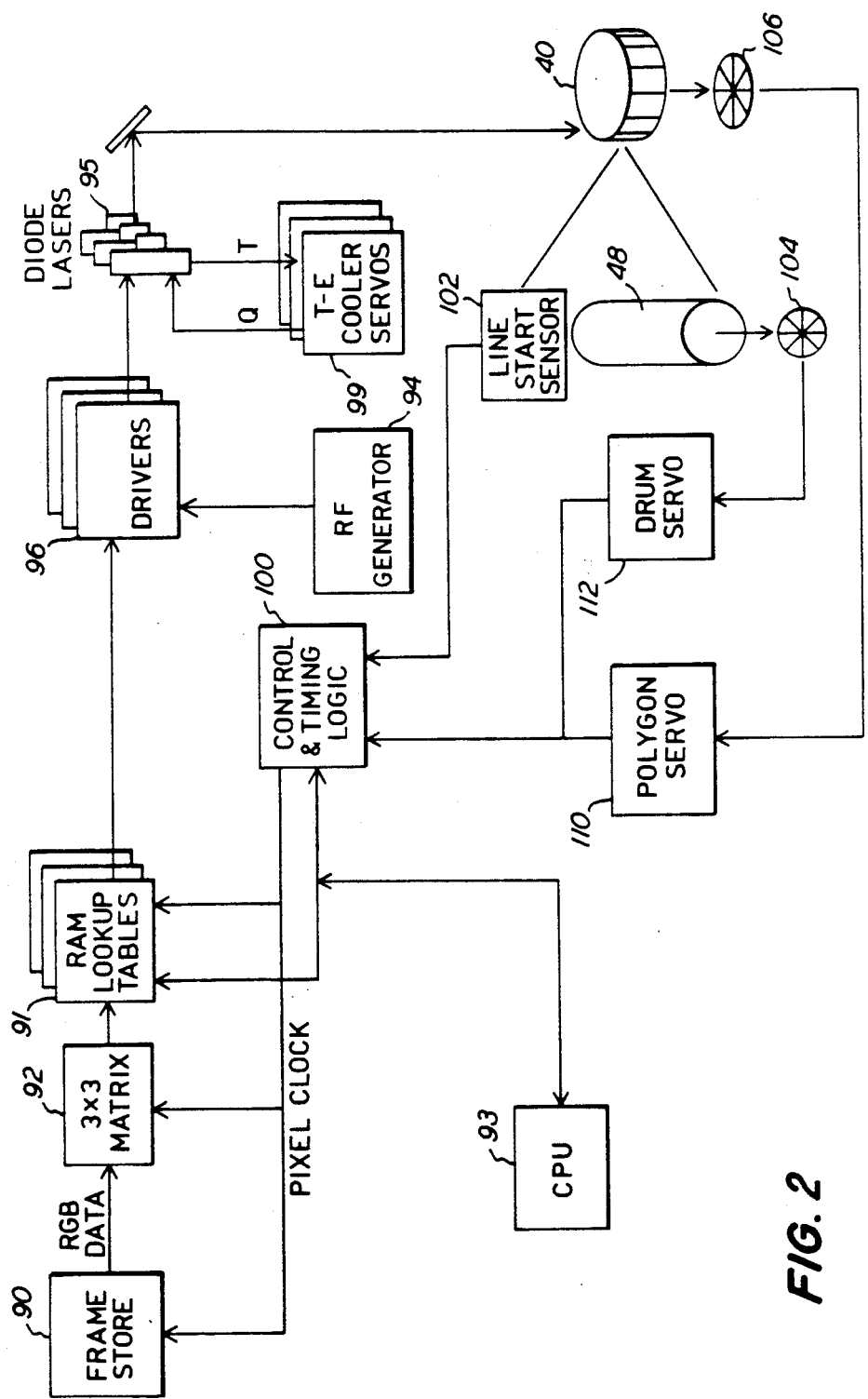
FIG. 2 is a block diagram of the electronic elements in the printer shown in FIG. 1.

A control system 89 for printer 10 is shown in FIG. 2. Control system 89 comprises a frame store 90 for storing image data received from an image scanner or from an image storage medium (not shown). The data stored in frame store 90 includes, for example, three 8-bit values for each pixel, each of the values representing the red, green, or blue input for the pixel. A matrix multiplication circuit 92 multiplies the 8-bit red, green, and blue values by a 3 ×3 matrix in order to effect desired color corrections.

The output from circuit 92 is applied to RAM lookup tables 91 which perform the necessary scaling for linearization, calibration, and correction for facet-to-facet reflectivity variations of the polygon 40. Updated values for the lookup tables 91 can be provided by a central processing unit 93. Digital video signals from lookup tables 91 are provided to drivers 96 for diode lasers 95. For reason which will be apparent from the discussion which follows, signals from a radio frequency (RF) generator 94 are also provided to drivers 96. Thermoelectric coolers for the diode laser 95 are controlled by thermoelectric cooler servos 99.

A control and timing logic circuit 100 is provided to manage the data flow during the operation of printer 10 and to control the printer timing. Circuit 100 accepts timing signals from a drum servo 112, a polygon servo 110, and an optical fiber line start sensor 102, and these signals are used to synchronize the printing operations. These timing signals include a once-per-revolution pulse from drum servo 112 which receives inputs from an encoder 104, a once-per-facet pulse from servo 110 which receives inputs from an encoder 106, and a line-start pulse that is generated when the laser beam crosses an optical fiber (not shown) in line start sensor 102. Upon receipt of these signals, a pixel clock is started, and the data is clocked through the data circuits. Also included in circuit 100 are a pixels-per-line counter for line length control and a facet counter for controlling the addressing of the lookup tables 91.

Optical feedback occurs in a diode laser printer when a minute fraction of the laser output is reflected back into the laser diode by one of the external optical surfaces of the system. In the absence of some means for overcoming the effects of optical feedback, a nonlinear relationship will exist between drive current and laser diode output power in the printer. This nonlinearity of the output makes calibration very difficult in a continuous-tone printer. The changes in the optical intensity caused by the optical feedback are not predictable and appear to be random. An optical isolator using, for example, a linear polarizer and a quarter-wave plate, changes the linear polarization of a beam into circular polarization. This form of polarization, however, cannot be used in printer 10 which has two dichroic beam combiners with very sharp cut-off characteristics for the appropriate linear polarization.

Generally, there are two noise components which are caused by the optical feedback interference. One component is a high-frequency fluctuation which has a series of spectral peaks at frequencies corresponding to integer multiples of the round-trip transit time of the light traveling between an external optical surface and the laser diode facet. This noise spectral frequency of a few GHz is far above the sensitive range of frequency for banding in a scanning laser printer and is not a concern. The second component is more troublesome and gives fluctuations at much lower frequencies. Frequencies from D.C. to 40 MHz have been observed. The D.C. component of the noise spectrum, which is caused by a threshold current change due to the feedback interference, severely affects the performance of the printer. This noise fluctuation causes unpredictable changes in the laser diode output, and these output changes, which can be up to 10% of the D.C. output level, are not acceptable.

In accordance with the present invention, high frequency modulation is used to overcome the effects of optical feedback. It is thought that the addition of high-frequency modulation reduces the effects of optical feedback by broadening the spectral linewidth of the laser so that its output is less coherent. Stated another way, if the laser is modulated rapidly enough that the reflected light does not have the same optical frequency as the laser is emitting, there will be no interaction; the laser is no longer resonant at the same frequency as the reflected light.

Figure 3:
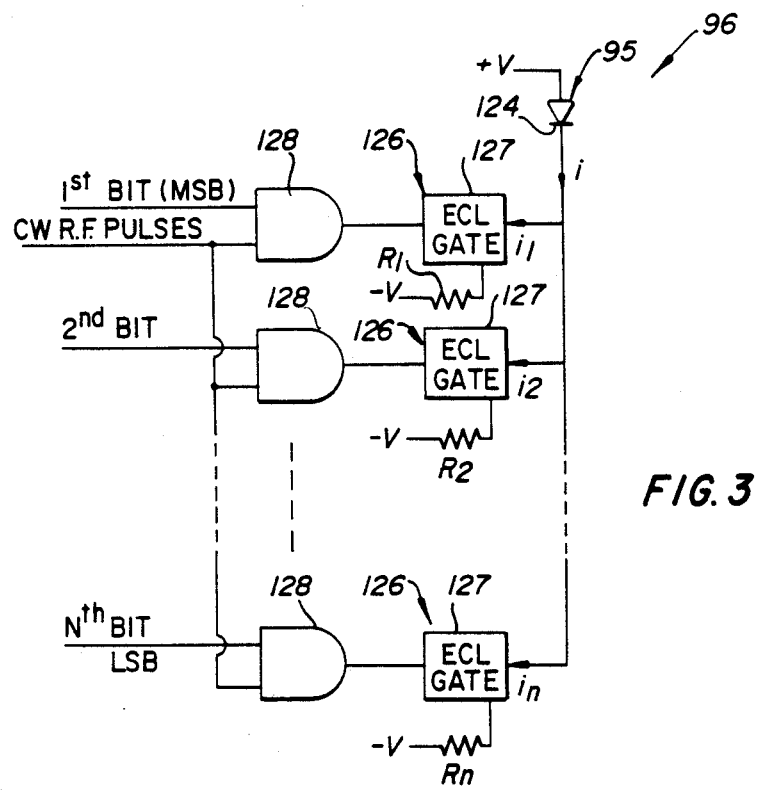
FIG. 3 is a schematic diagram of the driver of the present invention.

With reference to FIG. 3, there is shown a schematic diagram of driver 96 which is configured in accordance with the present invention to overcome the effects of optical feedback. Driver 96 is adapted to control the drive current in a diode laser 95 in proportion to the magnitude of a digital video signal in order to produce the desired light level for each of the pixels in an image. It will be understood that in applications, such as printer 10, a separate driver 96 will be provided for each of the diode lasers.

The cathode 124 of diode laser 95 is connected to a plurality of current-weighted subdrivers 126 which control the instantaneous current through the diode laser 95. The number of subdrivers 126 is equal to a number n of bits in the video signal and n could be, for example, 8 or 12. Each of the subdrivers 126 includes an emitter-coupled logic (ECL) gate 127 and a resistor $R_1 - R_n$. Each of the ECL gates 127 can be, for example, a 100K ECL gate, obtainable from the Motorola Co.

The sizes of the resistors $R_1 - R_n$ are determined such that each of the subdrivers 126 contributes its own binary-weighted output current. Thus, for example, if the first bit is the most significant bit (MSB) and the nth bit is the least significant bit (LSB), as shown in FIG. 3, then the current $i_1$ could equal $\frac{1}{2}$ i, the current $i_2$ could equal $\frac{1}{4}$ i, and the current $i_n$ would equal $\frac{1}{2^n}$i. It will be seen that the total output will be determined by the n bit binary number.

Signals to ECL gates 127 are provided through ECL AND gates 128. When the voltage of the signal to an ECL gate 127 is above a predetermined level, the resistor $R_n$ associated with the ECL gate will be placed in the circuit and will determine, in part, the current in diode laser 95. One of the inputs to each AND gate 128 is one bit of the video signal, the MSB to the LSB of the signal being provided to the AND gates 128 as shown in FIG. 3. The other input to the AND gate 128 is an RF signal which serves as a high frequency carrier. It will be understood that both of the inputs to the AND gate 128 have been adjusted to ECL logic levels in a manner well known in the art. The frequency of the RF carrier should be much higher than the video bandwidth so that the desired image is not distorted. The RF carrier frequency can be, for example, higher than 300 MHz.

Figure 4A:
FIGS. 4a–4c are representations, respectively, of the digital video signal, the RF signal, and the composite signal.
Figure 4B:
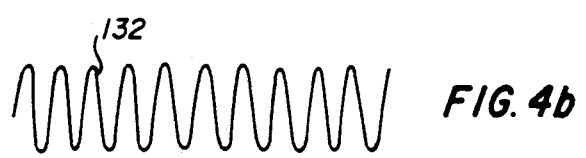
Figure 4C:

In FIGS. 4a–4c, there is shown a representation of the formation of the composite signal provided to each ECL gate 128. The video signal 130, which can be a few KHz, is shown in FIG. 4a, and the RF carrier signal 132 is shown in FIG. 4b. The sinusoidal RF carrier signal, adjusted to ECL level, is fed to AND gates 128. The composite signal 134 produced by the video signal and the RF signal is shown in FIG. 4c.

From the foregoing description, it will be seen that a very effective circuit is provided for not only converting a digital video signal to an analog signal but also for making the analog signal pulsate at a high frequency relative to the information signal in order to overcome the effects of optical feedback in the apparatus.

The invention has been described in detail with particular reference to the preferred embodiments thereof, but it will be understood that variations and modifications can be effected within the spirit and scope of the invention.

I claim:

1. A driver for a diode laser for use in an apparatus which produces optical feedback, said driver being adapted to receive a digital video signal and to produce an output which is proportional to the magnitude of said signal, said driver comprising:

means for generating a composite signal which is comprised of said digital video signal and an RF signal; and means for receiving said composite signal and for producing a current in said diode laser which proportional to the magnitude of said composite signal, said receiving and producing means including a plurality of subdrivers, and each of said subdrivers being adapted to receive said RF signal and one bit of said digital video signal.

2. A driver, as defined in claim 1, wherein each of said subdrivers includes an ECL gate and a current-weighted resistor.

3. A driver, as defined in claim 2, wherein each of said ECL gates is connected to a cathode of said diode laser.

4. A driver, as defined in claim 1, wherein said RF signal is greater than 300 MHz.

5. A driver for a diode laser comprising:

a current source for connection to said diode laser;

a plurality of subdrivers connected to said diode laser, each of said subdrivers including a gate and a resistor of a predetermined value; and signal means connected to each of said gates for triggering each gate to effect a current flow through the gate and its respective resistor, said signal means being adapted to receive a RF signal and a digital signal and to provide a signal to a gate when said digital signal is high.

6. A driver, as defined in claim 5, wherein said gates are ECL gates.

7. A driver, as defined in claim 5, wherein said signal means is an AND gate.

* * * * *